(12) United States Patent
Funaki et al.

(10) Patent No.: US 9,440,887 B2
(45) Date of Patent: Sep. 13, 2016

(54) SILICON NITRIDE SINTERED BODY AND WEAR RESISTANT MEMBER USING THE SAME

(71) Applicants: KABUSHIKI KAISHA TOSHIBA, Tokyo (JP); TOSHIBA MATERIALS CO., LTD., Yokohama-shi, Kanagawa-ken (JP)

(72) Inventors: Kai Funaki, Yokohama (JP); Michiyasu Komatsu, Yokohama (JP); Haruhiko Yamaguti, Yokohama (JP); Katsuyuki Aoki, Yokohama (JP)

(73) Assignees: KABUSHIKI KAISHA TOSHIBA, Minato-Ku (JP); TOSHIBA MATERIALS CO., LTD., Yokohama-Shi (JP)

(*) Notice: Subject to any disclaimer, the term of this patent is extended or adjusted under 35 U.S.C. 154(b) by 0 days.

(21) Appl. No.: 14/438,756

(22) PCT Filed: Oct. 21, 2013

(86) PCT No.: PCT/JP2013/078447
§ 371 (c)(1),
(2) Date: Apr. 27, 2015

(87) PCT Pub. No.: WO2014/069268
PCT Pub. Date: May 8, 2014

(65) Prior Publication Data
US 2015/0251957 A1   Sep. 10, 2015

(30) Foreign Application Priority Data

Oct. 30, 2012 (JP) ................ 2012-239654

(51) Int. Cl.
| | | |
|---|---|---|
| *C04B 35/587* | (2006.01) | |
| *F16C 33/32* | (2006.01) | |
| *F16C 33/62* | (2006.01) | |
| *F16C 33/14* | (2006.01) | |
| *C04B 35/593* | (2006.01) | |

(52) U.S. Cl.
CPC .......... *C04B 35/587* (2013.01); *C04B 35/593* (2013.01); *C04B 35/5935* (2013.01);
(Continued)

(58) Field of Classification Search
CPC .... C04B 35/584; C04B 35/587; F16C 33/32
See application file for complete search history.

(56) References Cited

U.S. PATENT DOCUMENTS

| | | | | |
|---|---|---|---|---|
| 6,784,131 B2* | 8/2004 | Komatsu | ................ | F16C 33/32 384/492 |
| 6,797,660 B2* | 9/2004 | Komatsu | ............... | C04B 35/584 384/492 |
| 7,192,899 B2* | 3/2007 | Komatsu | ............... | C04B 35/593 501/97.2 |
| 7,612,006 B2* | 11/2009 | Komeya | ................ | B82Y 30/00 252/506 |
| 2002/0010068 A1* | 1/2002 | Komatsu | ............... | C04B 35/584 501/97.2 |
| 2002/0136908 A1* | 9/2002 | Komatsu | ................ | F16C 33/32 428/446 |

(Continued)

FOREIGN PATENT DOCUMENTS

| | | | |
|---|---|---|---|
| EP | 0 726 237 A2 | | 8/1996 |
| EP | 2062864 | * | 5/2009 |

(Continued)

*Primary Examiner* — Karl Group
(74) *Attorney, Agent, or Firm* — Foley & Lardner LLP (57) ABSTRACT

The present invention provides a silicon nitride sintered body comprising a silicon nitride crystalline particle and a grain boundary phase, the silicon nitride sintered body having an area ratio of the grain boundary phase per 100 μm×100 μm unit area of 15 to 35% when an arbitrary cross section thereof is photographed. Further, it is preferable that the area ratio of the grain boundary phase per 100 μm×100 μm unit area is 15 to 25%. Furthermore, the silicon nitride sintered body is suitable for a wear resistant member. Due to above structure, there can be provided a silicon nitride sintered body and a wear resistant member having a high processability (workability) and an excellent sliding property.

9 Claims, 1 Drawing Sheet (52) U.S. Cl.
CPC ............ *F16C33/145* (2013.01); *F16C 33/32* (2013.01); *F16C 33/62* (2013.01); *C04B 2235/3217* (2013.01); *C04B 2235/3222* (2013.01); *C04B 2235/3224* (2013.01); *C04B 2235/3225* (2013.01); *C04B 2235/3232* (2013.01); *C04B 2235/3239* (2013.01); *C04B 2235/3241* (2013.01); *C04B 2235/3244* (2013.01); *C04B 2235/3251* (2013.01); *C04B 2235/3256* (2013.01); *C04B 2235/3258* (2013.01); *C04B 2235/3826* (2013.01); *C04B 2235/3839* (2013.01); *C04B 2235/3865* (2013.01); *C04B 2235/5436* (2013.01); *C04B 2235/5445* (2013.01); *C04B 2235/767* (2013.01); *C04B 2235/78* (2013.01); *C04B 2235/786* (2013.01); *C04B 2235/788* (2013.01); *C04B 2235/85* (2013.01); *C04B 2235/96* (2013.01); *C04B 2235/963* (2013.01)

(56) References Cited

U.S. PATENT DOCUMENTS

| 2006/0128552 | A1 | 6/2006 | Komatsu | |
|---|---|---|---|---|
| 2011/0039068 | A1 | 2/2011 | Takao | |
| 2012/0321851 | A1* | 12/2012 | Takao | C04B 35/5935 428/141 |

FOREIGN PATENT DOCUMENTS

| JP | 58-026076 A | 2/1983 |
|---|---|---|
| JP | 06-298568 A | 10/1994 |
| JP | 2001-328869 A | 11/2001 |
| JP | 2003-034581 A | 2/2003 |
| JP | 2010-241616 A | 10/2010 |
| WO | WO 2005/113466 A1 | 12/2005 |
| WO | WO 2009/128386 A1 | 10/2009 |
| WO | WO 2013/035302 A1 | 3/2013 |

* cited by examiner

SILICON NITRIDE SINTERED BODY AND WEAR RESISTANT MEMBER USING THE SAME

TECHNICAL FIELD

The present invention relates to a silicon nitride sintered body and a wear resistant member using the silicon nitride sintered body, particularly to a silicon nitride sintered body having a favorable processability (workability) and a wear resistant member using the silicon nitride sintered body.

BACKGROUND ART

A silicon nitride sintered body has been used as a wear resistant member such as a bearing ball or a roller making use of the wear resistance thereof. As a conventional sintering composition for the silicon nitride sintered body, a silicon nitride-yttrium oxide-aluminum oxide-aluminum nitride-titanium oxide-based composition or the like has been known (Patent Document 1: Japanese Patent Laid-Open No. 2001-328869). A silicon nitride sintered body having an improved sinterability (sintering property) and an excellent wear resistance has been obtained by using yttrium oxide, aluminum oxide, aluminum nitride, and titanium oxide as specific sintering aids (sintering agents).

Moreover, a silicon nitride sintered body formed by using yttrium oxide-$MgAl_2O_4$ spinel-silicon carbide-titanium oxide as the sintering aids is disclosed in Patent Document 2 (Japanese Patent Laid-Open No. 2003-34581). In Patent Document 2, the sintering temperature can be lowered to be 1600° C. or lower.

Both the sintered bodies obtained in Patent Document 1 and Patent Document 2 have had a favorable sintering property and an excellent wear resistance. On the other hand, these conventional silicon nitride sintered bodies have had a high hardness and have been hardly processable (workable) materials. It is necessary that the wear resistant member such as a bearing ball have a smooth surface having a surface roughness Ra of 0.1 μm or less as a sliding surface. A diamond abrasive grain has usually been used for surface processing of the silicon nitride sintered body; however, since the conventional silicon nitride sintered bodies are hardly processable materials, the load of polishing work has been large to become a factor of an increase in costs.

PRIOR ART DOCUMENTS

Patent Documents

Patent Document 1: Japanese Patent Laid-Open No. 2001-328869
Patent Document 2: Japanese Patent Laid-Open No. 2003-34581

SUMMARY OF THE INVENTION

Problems to be Solved by the Invention

The development of a silicon nitride sintered body so far has only been focused on enhancing material characteristics such as fracture toughness in order to improve the wear resistance. Certainly, the wear resistance is improved by improving the material characteristics. Such a silicon nitride sintered body is optimal for a bearing ball used in a high-load environment, such as machine tools.

On the other hand, the wear resistant members such as a bearing ball are not limited to the wear resistant members used under a high-load environment, and the wear resistant members have also been used under a low-load environment, such as a bearing for fan motors of personal computers or the like. The silicon nitride sintered bodies described in Patent Document 1 and Patent Document 2 have excellent characteristics; and therefor, can also be used for a bearing for fan motors. However, there have been posed problems such that the silicon nitride sintered bodies have a poor processability and that the costs become high.

The present invention has been made to deal with such problems and intends to provide a silicon nitride sintered body having a favorable processability.

Means for Solving the Problems

In order to achieve the above-described object, the silicon nitride sintered body according to the present invention is a silicon nitride sintered body comprising a silicon nitride crystalline particle and a grain boundary phase, the silicon nitride sintered body having an area ratio of the grain boundary phase per 100 μm×100 μm unit area of 15 to 35% when an arbitrary cross section thereof is photographed.

It is preferable that the area ratio of the grain boundary phase per 100 μm×100 μm unit area is 15 to 25%. Further, it is also preferable that a total area ratio of the silicon nitride crystalline particle, having a major axis L of 1 μm or more in a 100 μm×100 μm unit area is 60% or more, and any aspect ratio (major axis L/minor axis S) of the silicon nitride crystalline particles having a major axis of 1 μm or more is 7 or less.

It is preferable that a peak is detected in a range from 29.5 to 30.5° when XRD analysis of the silicon nitride sintered body is conducted. It is preferable that a height ratio ($I_{29.5-30.5}/I_{\beta-Si3N4}$) of a peak height $I_{29.5-30.5}$ in the range from 29.5 to 30.5° to a maximum peak height $I_{\beta-Si3N4}$ of β-silicon nitride is in a range from 0.05 to 0.25. It is preferable that the peak in the range from 29.5 to 30.5° is a peak attributable to a compound of group 4A element-rare earth element-oxygen. It is preferable that the peak in the range from 29.5 to 30.5° is attributable to a compound of hafnium-yttrium-oxygen. It is preferable that silicon nitride sintered body comprises: 2 to 8 mass % of Al in terms of an oxide thereof; 1 to 3.5 mass % of a rare earth element in terms of an oxide thereof; and 1 to 5 mass % of any one or more of a group 4A element, a group 5A element, and a group 6A element in terms of an oxide thereof. Furthermore, it is preferable that a machinable coefficient of the silicon nitride sintered body is within a range from 0.120 to 0.150.

The wear resistant member of the present invention comprises the silicon nitride sintered body of the present invention. It is preferable that a sliding surface of the silicon nitride sintered body is a polished surface having a surface roughness Ra of 0.1 μm or less. It is preferable that the wear resistant member is a bearing ball. Furthermore, it is also preferable that the bearing ball is a bearing ball for fan motors.

Advantages of the Invention

In the silicon nitride sintered body according to the present invention, the proportion of the grain boundary phase is controlled in a micro area of 100 μm×100 μm unit area. Therefore, it is easy to conduct surface processing such as polishing. Moreover, both the improvement in processability and the wear resistance can be achieved by controlling the silicon nitride crystalline particle and the compound in the grain boundary phase. Accordingly, it becomes possible to reduce processing time and processing costs while maintaining the wear resistant characteristics when the silicon nitride sintered body according to the present invention is applied to the wear resistant member.

DESCRIPTION OF EMBODIMENTS

The silicon nitride sintered body according to the present invention is a silicon nitride sintered body comprising a silicon nitride crystalline particle and a grain boundary phase, the silicon nitride sintered body having an area ratio of the grain boundary phase per 100 μm×100 μm unit area of 15 to 35% when an arbitrary cross section thereof is photographed.

The silicon nitride sintered body comprises a silicon nitride crystalline particle to be a main phase and a grain boundary phase that is a sub-phase. The grain boundary phase is mainly formed from a compound produced by reacting the sintering aids or by reacting the sintering aid with silicon nitride (including impurity oxygen) in the sintering process. The sintering aid is added for the purpose of controlling the sintering property (sinterability), and the grain boundary phase is formed in the interstices (grain boundaries) between silicon nitride crystalline particles. The binding power between silicon nitride crystalline particles is strengthened due to the grain boundary phase.

When the hardness of the silicon nitride crystalline particle and the hardness of the grain boundary phase are compared, the grain boundary phase usually has a lower hardness. Therefore, it has been considered that it is effective to reduce the hardness of the silicon nitride sintered body itself by making the proportion of the grain boundary phase that is softer than the silicon nitride crystalline particle large before applying polishing to the silicon nitride sintered body. Certainly, an effect to some extent is obtained by reducing the hardness of the silicon nitride sintered body.

When the silicon nitride sintered body is applied to a wear resistant member as mentioned later, a polished surface having a high flatness (smoothness), the polished surface having a surface roughness Ra of 0.1 μm or less is required depending on the intended use. The polished surface is used as a sliding surface. For example, in the case of the bearing ball, sliding characteristics can be improved by making the whole surface of the silicon nitride sintered body a flat surface. Generally, polishing with a diamond wheel has been conducted for polishing the silicon nitride sintered body. It has been considered that it is easier to conduct polishing when the proportion of the grain boundary phase which is softer than the silicon nitride crystalline particle is made large in conducting polishing.

However, in the case where a flat surface having a surface roughness Ra of 0.1 μm or less is intended to be obtained, it has been found that a clean, flat surface is hard to obtain because the way how the silicon nitride crystal particle and the grain boundary phase are polished varies.

With the present invention, variation in processability due to the difference in the hardness between the silicon nitride crystalline particle and the grain boundary phase can be reduced to improve the processability by making the area ratio of the grain boundary phase in the micro area of 100 μm×100 μm unit area in a range from 15 to 35%.

When the area ratio of the grain boundary phase is less than 15%, the grain boundary phase is too small and the wear resistance of the silicon nitride sintered body is lowered. On the other hand, when the area ratio of the grain boundary phase exceeds 35%, the grain boundary phase is too large and the variation in processability occurs.

Therefore, the proportion of the grain boundary phase is 15 to 35%, preferably 15 to 25%. The silicon nitride sintered body according to the present invention is constituted so that the area ratio of the grain boundary phase in a micro area of a 100 μm×100 μm unit area in an arbitrary cross section is in a range from 15 to 35%.

In this connection, the method for measuring the area ratio of the grain boundary phase is as follows. First of all, an arbitrary cross section of the silicon nitride sintered body is obtained. Then, a mirror finishing is applied to the cross section so as to have a surface roughness Ra of 0.1 μm or less. Subsequently, a plasma etching treatment is conducted to the obtained mirror plane in order to clearly define the areas of the silicon nitride crystalline particle and the grain boundary phase. When the plasma etching treatment is conducted, the etching rates differ between the silicon nitride crystalline particle and the grain boundary phase; and therefore, either one is etched off more than the other.

For example, the etching rate of the silicon nitride crystalline particle is higher (easy to be etched) in plasma etching using $CF_4$; and therefore, the silicon nitride crystalline particle portion becomes a concave portion, while the grain boundary phase portion becomes a convex portion. In addition, etching treatment is also possible by chemical etching using an acid and an alkali.

Next, take a photograph of a SEM image (1000 or more magnifications) of the mirror plane after the etching treatment. The silicon nitride particle and the grain boundary phase can be-distinguished by the difference in contrast in the SEM photograph. The grain boundary phase is usually observed as a white color. The difference in contrast can be made clearer by conducting the etching treatment. The area ratio of the grain boundary phase per unit area can be measured by conducting the image analysis of the SEM photograph. In addition, a method of image analysis by conducting color mapping of the grain boundary portion is effective as the image analysis. Moreover, when the 100 μm×100 μm unit area cannot be obtained in one observation field, a plurality of photographing may be conducted so as to obtain the 100 μm×100 μm unit area in total.

The silicon nitride sintered body according to the present invention improves the processability by controlling the fine structure of the inside of the sintered body, particularly controlling the grain boundary phase. The processing, that is mentioned here, designates the processing for obtaining the intended dimensions and the intended surface roughness by colliding abrasive grains with the surface of ceramics to break the fine structure on the surface by the impact of collision, such as grinding with a fixed abrasive grain and lapping with a loose abrasive grain.

Different from a substance that is made of a single phase such as a metal, the silicon nitride sintered body is a composite material that is made of two phases, the silicon nitride crystalline particle and the grain boundary phase, each having different hardness and Young's modulus. Therefore, when the abrasive grain is collided with the surface of the silicon nitride sintered body, it is considered that the grain boundary phase having a low hardness, particularly the amorphous phase is detached first and thereafter the silicon nitride particle retained by the grain boundary phase is detached.

In order to shorten, the processing time of the silicon nitride, it is necessary to make the detaching rate of the silicon nitride crystalline particle that occupies the most part of the sintered body large; and therefore, the processing time can be shortened by reducing the amount of the grain boundary phase which retains the silicon nitride particle, the amount of the amorphous phase in particular, to make the detaching rate of the silicon nitride particle large.

Moreover, it is preferable that a total area ratio of the silicon nitride crystalline particle having a major axis L of 1 μm or more in a 100 μm×100 μm unit area is 60% or more, and any aspect ratio (major axis L/minor axis S) of the silicon nitride crystalline particles having a major axis of 1 μm or more is 7 or less. Further, in order to make the detaching rate of the silicon nitride crystalline particle larger in addition to satisfy the amount of the grain boundary phase, it is preferable that the silicon nitride particle size is adjusted so as to become large and the aspect ratio (major axis/minor axis) is adjusted so as to become small.

The method for measuring the area ratio of the silicon nitride crystalline particle having a major axis L of 1 μm or more in the 100 μm×100 μm unit area is as follows. First of all, an enlarged photograph (SEM photograph of 1000 magnifications or more) of a 100 μm×100 μm unit area is taken.

Figure 2:
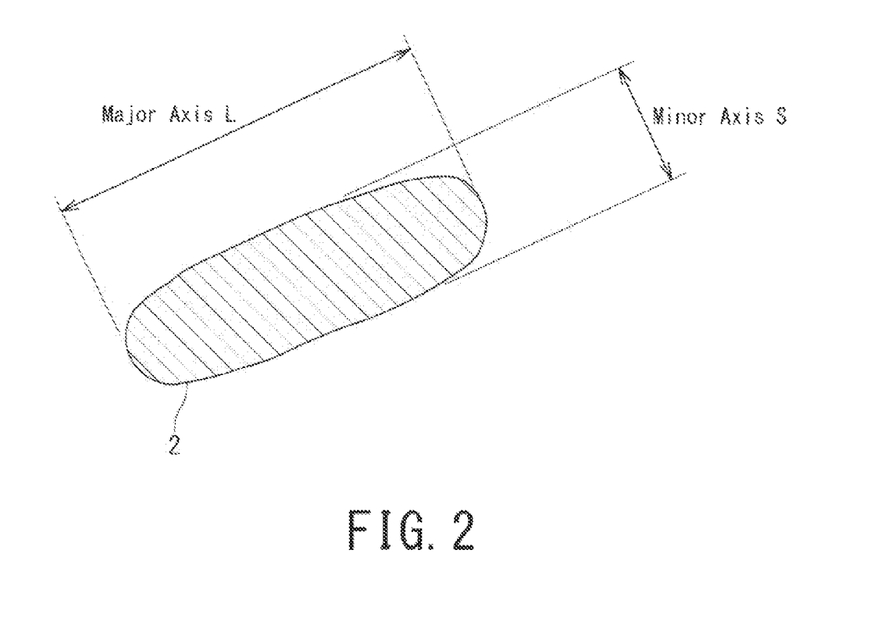
FIG. 2 is a sectional view illustrating a method for measuring an aspect ratio of a silicon nitride crystalline particle.

The major axis L of the silicon nitride crystalline particles in the enlarged photograph is measured to determine the total area of the silicon nitride crystalline particle having a major axis L of 1 μm or more. As shown in FIG. 2, the longest diagonal line in the silicon nitride crystalline particle 2 in the enlarged photograph is defined as the major axis L and the line length orthogonal to the major axis at the middle point of the major axis L is defined as the minor axis S, and the major axis L and the minor axis S are measured.

It is preferable that every aspect ratio (major axis L/minor axis S) of the silicon nitride crystalline particles having a major axis L of 1 μm or more is made 7 or less. Complicated entanglement of the silicon nitride crystalline particles of more than necessary can be prevented by making the aspect ratio as small as 7 or less.

As a result thereof, the volume of the silicon nitride crystalline particle that is scraped off while polishing is large, furthermore the complicated entanglement of the silicon nitride crystalline particles does not occur; and therefore, the silicon nitride crystalline particle becomes easy to be scraped off.

In addition, since 15 to 35% of the grain boundary phase is present as mentioned previously, the upper limit of the area ratio of the silicon nitride particle having a major axis L of 1 μm or more is 85%. Moreover, the silicon nitride crystalline particle having a major axis L of less than 1 μm may be present.

It is preferable that a peak is detected in the range from 29.5 to 30.5° when XRD analysis of the silicon nitride sintered body is conducted. First of all, description is made on the XRD analysis. In the XRD analysis, an arbitrary cross section of the silicon nitride sintered body is designated as a measuring surface. The measuring surface is defined as a polished surface that is polished so as to have a surface roughness Ra of 1 μm or less. The XRD analysis is carried out under the measurement conditions of Cu target (Cu—Kα), a tube voltage of 40 kV, a tube current of 40 mA, a scan speed of 2.0°/min, a slit (RS) of 0.15 mm, and a scanning range (2θ) from 10° to 60°.

The peak detected in the range from 29.5 to 30.5° is a peak based on a component of the grain boundary phase. The detection of the peak based on the component of the grain boundary phase means that a crystalline compound is present in the components of the grain boundary phase. The grain boundary phase of the conventional silicon nitride sintered bodies such as the silicon nitride sintered bodies disclosed in Patent Document 1 and Patent Document 2 is an amorphous phase. In the case of the amorphous phase, a peak is never detected even though the XRD analysis is conducted.

The grain boundary phase that is made of an amorphous phase has a lower Young's modulus and a lower hardness than the silicon nitride crystalline particle, and works to retain the silicon nitride crystalline particle. The crystalline compound is produced in the components of the grain boundary phase to make the Young's modulus and the hardness high at a part where the crystalline compound is produced and make the function of retaining the silicon nitride crystalline particle weak, resulting in an improvement in processability.

It is preferable that a height ratio ($I_{29.5-30.5}/I_{\beta\text{-}Si3N4}$) of a peak height $I_{29.5-30.5}$ in the range from 29.5 to 30.5° to a maximum peak height $I_{\beta\text{-}Si3N4}$ of β-silicon nitride is in a range from 0.05 to 0.25. The maximum peak height $I_{\beta\text{-}Si3N4}$ of β-silicon nitride is a peak detected in the range from 26.7° to 27.7°.

When the peak height ratio ($I_{29.5-30.5}/I_{\beta\text{-}Si3N4}$) is less than 0.05, the amount of the crystalline compound is too small and the effect of producing the crystalline compound is not sufficient. On the other hand, when the height ratio ($I_{29.5-30.5}/I_{\beta\text{-}Si3N4}$) is large exceeding 0.25, the amount of the crystalline compound is too large and the strength of the grain boundary phase is lowered; and therefore, there is a risk that the wear resistance is lowered.

It is preferable that the peak in the range from 29.5 to 30.5° is a peak attributable to a compound of group 4A element-rare earth element-oxygen. It is preferable that the peak in the range from 29.5 to 30.5° is attributable to a compound of hafnium-yttrium-oxygen. As a compound other than the compound of hafnium-yttrium-oxygen, a compound of Zr—Y—O, a compound Zr—Er—O, and a compound of Hf—Er—O are preferable.

The position of a peak and full width at half maximum of XRD are determined by the composition of the crystalline compound. It has been found that the compound of group 4A element-rare earth element-oxygen is present as a crystalline compound when the peak in the range from 29.5 to 30.5° is present.

The group 4A element is any one or more of Ti (titanium), Zr (zirconium), and Hf (hafnium). The group 4A element reacts with a rare earth element and oxygen to easily form a crystalline compound of group 4A element-rare earth element-oxygen. As the group 4A element, hafnium or zirconium is preferable. Hafnium or zirconium easily reacts with oxygen in particular to easily form the intended crystalline compound. Hafnium or zirconium is effective in controlling the proportion of the grain boundary phase as in the present invention. The qualitative analysis of the crystalline compound produced in the grain boundary phase can be conducted by a TEM, or the like. When Hf and Zr are compared, Hf is more preferable because Hf reacts more easily with oxygen and a rare earth element.

It is preferable that silicon nitride sintered body comprises: 2 to 8 mass % of Al in terms of an oxide thereof; 1 to 3.5 mass % of a rare earth element in terms of an oxide thereof; and 1 to 5 mass % of any one or more of a group 4A element, a group 5A element, and a group 6A element in terms of an oxide thereof.

Al, the rare earth element, the group 4A element, the group 5A element, and the group 6A element are used as sintering aids for forming the grain boundary phase. Furthermore, when these elements react in the sintering process to become the component of the grain boundary phase, the proportion of the grain boundary phase is easily controlled if these elements are in the above-described range.

The conversion of the amount of Al in terms of the oxide thereof is conducted in terms of $Al_2O_3$. When the amount of Al is less than 2 wt % or exceeds 8 wt % in terms of the oxide thereof, lowering of the strength is brought about and the durability as the wear resistant member is lowered.

Moreover, the method of adding an Al component is not particularly limited as long as the component contains Al; however, any one or more of AlN, $Al_2O_3$, and $MgAl_2O_4$ spinel are preferable. Particularly, it is preferable to use either one of $Al_2O_3$ or $MgAl_2O_4$ together with AlN.

When $Al_2O_3$ or $MgAl_2O_4$ is used together with AlN, AlN easily suppresses the decomposition of silicon nitride and $SiO_2$ to SiO; and therefore, uniform grain growth is facilitated, resulting in a high crystallinity of the grain boundary phase structure. Moreover, when $Al_2O_3$ or $MgAl_2O_4$ is used together with AlN, a crystalline compound of AlN and $Al_2O_3$ or $MgAl_2O_4$ with a group 4A element and rare earth element becomes easily produced. As a result thereof, the silicon nitride particle-retaining power of the grain boundary phase is lowered, the size of the silicon nitride particle becomes large; and therefore, the processability is improved.

The silicon nitride sintered body comprises 1 to 3.5 wt % of any one or more rare earth elements in terms of the oxide of the rare earth element. It is preferable that the rare earth element is at least one or more of Y (yttrium), La (lanthanum), Cc (cerium), Pr (praseodymium), Nd (neodymium), Pm (promethium), Sm (samarium), Eu (ceuropium), Gd (gadolinium), Tb (terbium), Dy (dysprosium), Ho (holmium), Er (erbium), Tm (thulium), Yb (ytterbium), and Lu (lutetium).

The conversion to the oxide is conducted in terms of $R_2O_3$ where R represents a rare earth element. When the rare earth element is added as a sintering aid, it is preferable to add as a rare earth oxide powder. When the rare earth element is less than 1 wt % in terms of the oxide thereof, the sintering property is lowered and sufficient mechanical characteristics are not obtained. When the rare earth element exceeds 3.5%, the major axis/minor axis ratio of the silicon nitride particle becomes large to deteriorate the processability.

Moreover, the silicon nitride sintered body comprises 1 to 5 wt % of any one or more of a group 4A element, a group 5A element, and a group 6A element in terms of the oxide of the element. The group 4A elements are Ti (titanium), Zr (zirconium), and Hf (hafnium). The group 5A elements are V (vanadium), Nb (niobium), and Ta (tantalum). Further, the group 6A elements are Cr (chromium), Mo (molybdenum), and W (tungsten).

The conversion of the group 4A element in terms of the oxide thereof is conducted in terms of $TiO_2$, $ZrO_2$, or $HfO_2$. The conversion of the 5A element in terms of the oxide thereof is conducted in terms of $V_2O_5$, $Nb_2O_5$, or $Ta_2O_5$. Further, the conversion of the group 6A element in terms of the oxide thereof is conducted in terms of $Cr_2O_3$, $MoO_3$, or $WO_3$.

When the group 4A element component, the group 5A element component, or the group 6A element component is added as a sintering aid, it is preferable to add as any one of an oxide, a carbide, and a nitride. When the content amount is less than 1 wt %, the effect of addition is insufficient, and when the content amount exceeds 5 wt %, the sinterability conversely becomes deteriorated.

The crystalline phase can be produced in the grain boundary phase formed by the aforementioned Al component and rare earth element component, and the processability can be improved by the group 4A element component, the group 5A element component, or 6A element component being present. Particularly, it is preferable that both the group 4A element component and the group 6A element component are contained. When both the group 4A element component and the group 6A element component are contained, it is preferable that the group 4A element component is added as an oxide and the group 6A element component is added as a carbide. The effect of forming the intended crystalline compound in the grain boundary phase is obtained by the oxide of the group 4A element, and the effect of strengthening of the grain boundary phase and the effect of improving the lubricity of the sliding surface are obtained by the carbide of the group 6A element.

It is preferable that the machinable coefficient of the silicon nitride sintered body is within a range from 0.120 to 0.150. The machinable coefficient Mc is a value calculated from the following equation (1).

$$Mc = Fn^{9/8}/(K_{1c}^{1/2} \cdot Hv^{5/8}) \quad (1)$$

In the equation (1), Fn represents the indentation load and is 20 kgf here. An indentation load Fn of 20 kgf is a value suitable for measuring the hardness or toughness of the silicon nitride sintered body. The Vickers hardness (Hv) is measured in accordance with JIS-R-1610. The fracture toughness value ($K_{1c}$) is measured in accordance with an indentation fracture method (IF method) in JIS-R-1607. Niihara's equation is used for calculating the fracture toughness value. With respect to the bearing ball mentioned later, measurement is conducted using the cross section thereof.

The machinable coefficient Mc is a coefficient showing processability using the indentation load (Fn), the Vickers hardness (Hv), and the fracture toughness value ($K_{1c}$). This is a relational expression of a lateral crack destruction model, and Mc represents an amount of substance removed by a grain of abrasion grain. A larger machinable coefficient Mc means that the processable amount at a time becomes larger.

The lateral crack destruction model is a model proposed by Evans and Marshall as a mechanism of removing materials at the time of grinding work. In this model, it is shown that the amount of a substance (delta V) which is removed when one abrasive grain for grinding passes through the surface of a material is proportional to a value of $[Fn^{9/8}/(K_{1c}^{1/2} \cdot Hv^{5/8})]$ in a relation among the force Fn of vertically pushing the abrasive grain into the material, the Vickers hardness (Hv), and the fracture toughness value ($K_{1c}$). Here, the delta V is replaced with the machinable coefficient Mc.

Processing is largely classified into a fragile mode and a ductile mode. The fragile mode corresponds to so-called "rough processing", and the ductile mode corresponds to so-called "finishing". Wear is considered to correspond to the ductile mode; and therefore, it becomes important to improve processability in the fragile mode without lowering the processability in the ductile mode in order to satisfy the required performance of wear resistant members. Moreover, as one of the wear models, a mechanism has been proposed by which a fine pre-crack occurs in the grain boundary to bring about destruction on the surface of the material due to propagation of the fine pre-crack, resulting in the occurrence of wear.

A parameter Sc·m which represents the severeness of the mechanical contact in the wear model is expressed by the following equation from the coefficient of friction μ, the maximum Hertzian stress Pmax, the crystalline particle diameter d of a material, and the fracture toughness value $K_{1c}$.

$$Sc \cdot m = [(1+10 \cdot \mu) \cdot Pmax \cdot (d^{1/2})]/K_{1c}$$

The large Sc·m means that the wear is large, and the small Sc·m means that the wear is small. It is understood that it is possible to suppress the wear by making the crystalline particle diameter d of the material small or by making the fracture toughness value $K_{1c}$ large.

When these points are taken into consideration, it is preferable that the machinable coefficient Mc is in a range from 0.120 to 0.150. When the machinable coefficient Mc is less than 0.120, the amount of processing by the abrasion grain is small; and therefore, the time for processing of the silicon nitride sintered body increases. When the machinable coefficient Mc exceeds 0.150, the amount of processing of the silicon nitride sintered body by the abrasion grain becomes too large. When the amount of processing is large, the durability as a wear resistant member is lowered although the processability is improved.

The silicon nitride sintered body having a machinable coefficient Mc in a range from 0.120 to 0.150 has made it possible to improve the processability and reduce the production costs while maintaining the characteristics as a wear resistant member. In particular, since the area ratio of the grain boundary phase per unit area is controlled in the silicon nitride sintered body of the present invention, a flat surface (smooth surface) having a surface roughness Ra of 0.1 μm or less is easily obtained.

The silicon nitride sintered body according to the present invention is suitable for wear resistant members. The wear resistant members include a bearing ball, a roller, a check ball, a wear pad, a plunger, a koro, and so on. The wear resistant member slides with a mating member made of a metal member or a ceramic.

It is preferable to polish the wear resistant member so as to have a surface roughness Ra of 0.1 μm or less in order to improve the durability of the sliding surface. It is preferable to make the sliding surface flat so as to have a surface roughness Ra of 0.1 μm or less, further preferably 0.05 μm or less, more preferably 0.01 μm or less.

By making the sliding surface flat, the durability of the silicon nitride sintered body can be improved and the aggression to the mating member can also be lowered. By lowering the aggression to the mating member, exhaustion of the mating member can be reduced; and therefore, the durability of an apparatus incorporated with a wear resistant member can be improved.

Figure 1:
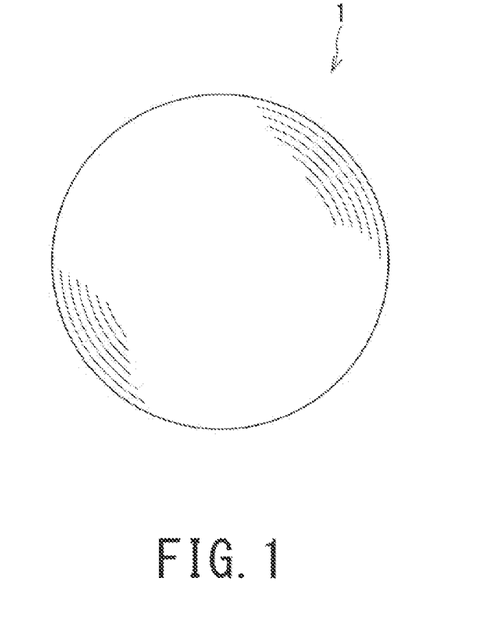
FIG. 1 is a perspective view illustrating an example of a bearing ball.

The silicon nitride sintered body according to the present invention is particularly suitable for an article such as a bearing ball to which polishing is conducted over the whole surface. FIG. 1 illustrates an example of the bearing ball (in the figure, numerical reference 1 denotes a bearing ball).

Furthermore, it is preferable that the bearing ball is for a bearing for fan motors. The fan motor is an apparatus used for cooling electronics such as a personal computer. In such a fan motor for electronics, the load that is applied to the bearing during operation is extremely small as compared with the load applied to a bearing for general machine tools.

The load applied to the bearing for general fan motors is 5 GPa or less, furthermore 2 GPa or less. In such a range, the durability that is required for the bearing ball made of a silicon nitride sintered body can be made lower than the durability of the bearing ball for machine tools. Reducing cost by making the processability better rather has a considerably large economical merit. In other words, the wear resistant member according to the present invention is suitable for a wear resistant member in which a load of 5 GPa or less is applied to the bearing.

Next, the description is made on the production method. The production method is not particularly limited as long as the silicon nitride sintered body of the present invention includes the above-described constitution; however, a method for efficiently obtaining the silicon nitride sintered body of the present invention includes the following method.

First of all, a silicon nitride powder is prepared. It is preferable that the silicon nitride powder has an oxygen content of 4 mass % or less, contains 85 mass % or more of α-phase type silicon nitride, and has an average particle diameter of 1.2 μm or less, further preferably 0.8 μm or less. A silicon nitride sintered body excellent in wear resistance can be obtained by causing grain growth to an $\alpha$-$Si_3N_4$ powder to produce a $\beta$-$Si_3N_4$ crystalline particle in the sintering process.

The area ratio of the grain boundary phase is controlled in the silicon nitride sintered body according to the present invention. It is effective to control the amount of a sintering aid and to control the aspect ratio of the silicon nitride crystalline particle to 7 or less for the purpose of performing such control. In order to control the amount of the sintering aid, it is effective to control the addition amount and to uniformly disperse the sintering aid with the silicon nitride powder.

It is preferable that the addition amount of the sintering aid is 2 to 8 mass % of Al in terms of an oxide thereof, 1 to 3.5 mass % of an rare earth element in terms of an oxide thereof, and 1 to 5 mass % of any one or more of a group 4A element, a group 5A element, and a group 6A element in terms of an oxide thereof. It is preferable that the average particle diameter of the sintering aid powder is 1.8 μm or less.

Moreover, it is effective to conduct a mixing process for long hours in order to uniformly disperse the silicon nitride powder with the sintering aid powder. It is effective to conduct a crushing and mixing process by a ball mill or the like, and it is preferable that the crushing and mixing process is conducted for as long as 50 hours or more.

By the crushing and mixing process, the silicon nitride powders, the sintering aid powders, and the silicon nitride powder and the sintering aid powder are prevented from bonding to become a secondary particle. Uniform dispersion can be conducted when most of the silicon nitride particles and the sintering aid powders become a primary particle.

It is effective to be capable of conducting a sufficient sintering even with a small amount of the sintering aid in order to control the area ratio of the grain boundary phase. For the purpose of conducting such sintering, it is effective to oxidize the surface of the silicon nitride powder in advance. By using the silicon nitride powder with an oxidized film, the silicon nitride powder can be activated to facilitate the reaction with the sintering aid.

The oxidation treatment to the silicon nitride powder includes heat treatment in the atmosphere, treatment with water, and so on. It is preferable that the heat treatment in the atmosphere is conducted at a temperature in a range from 600 to 1000° C. In addition, when an excessive oxidation treatment is conducted to the silicon nitride powder, the wear resistance of the silicon nitride sintered body is lowered; and therefore, an oxidized film having a film thickness of 5 µm or less is preferable.

Next, the binder is added to a raw material mixture obtained by mixing the silicon nitride powder and the sintering aid powder. Mixing of the raw material mixture with the binder is conducted using a ball mill or the like while conducting pulverization and granulation as necessary.

The raw material mixture is formed in a desired shape. The forming process is conducted with a die press, a cold isostatic press (CIP), or the like. A forming pressure of 100 MPa or more is preferable.

A formed body obtained by the forming process is degreased. It is preferable to conduct the degreasing process at a temperature in a range from 300 to 600° C. The degreasing process is conducted in the atmosphere or non-oxidizing atmosphere, and the atmosphere is not particularly limited.

Next, the degreased body obtained by the degreasing process is sintered at a temperature in a range from 1600 to 1900° C. When the sintering temperature is less than 1600° C., there is a risk that the grain growth of the silicon nitride crystalline particle becomes insufficient. That is to say, the reaction from α-phase type silicon nitride to β-phase type silicon nitride is insufficient and there is a risk that a dense structure in the sintered body is not obtained.

In this case, the reliability of the silicon nitride sintered body as a material is lowered. When the sintering temperature exceeds 190° C., the grain growth of the silicon nitride crystalline particle is too much; and therefore, there is a risk that the processability is lowered. The sintering process may be conducted by any of atmospheric sintering and pressure sintering. It is preferable that the sintering process is conducted in the non-oxidizing atmosphere. The non-oxidizing atmospheres include a nitrogen atmosphere and an argon atmosphere.

Moreover, it is preferable in the sintering process that a container for storing the degreased body is a porous type container. When the container is the porous type container, the non-oxidizing gas in the sintering process can be circulated in a sintering furnace and the heat is uniformly imparted to the degreased body. As a result thereof, the proportion of the grain boundary phase or the existence of the crystalline compound in the grain boundary phase can be made uniform.

In addition, it is preferable that the porosity of the porous type container is in a range from 30 to 60%. When the porosity is less than 30%, the proportion of the pore is small; and therefore, the circulation effect of the non-oxidizing gas cannot be obtained sufficiently. In particular, when a large number of degreased bodies were placed in the porous type container, there is some influence.

Moreover, when the porosity exceeds 60%, although the circulation effect of the non-oxidizing gas is obtained, the strength of the container is lowered to reduce the mass productivity. Therefore, it is preferable that the porous type container has a porosity in a range from 30 to 60%. Moreover, the material of the container is not particularly limited as long as the material is capable of withstanding the sintering temperature.

After completion of the sintering process, it is preferable that hot isostatic pressing (HIP) treatment of 30 MPa or more is applied to the sintered body in a non-oxidizing atmosphere. Non-oxidizing atmospheres include a nitrogen atmosphere and an argon atmosphere. It is preferable that the HIP treatment temperature is in a range from 1500 to 1900° C. By applying the HIP treatment, the pores in the silicon nitride sintered body can be eliminated. When the pressure of the HIP treatment is less than 30 MPa, such an effect cannot be obtained sufficiently.

A wear resistant member is manufactured by polishing a portion of the silicon nitride sintered body thus produced where the polishing is needed. It is preferable to conduct polishing with a diamond abrasive grain. Since the silicon nitride sintered body of the embodiment has a favorable processability, the processing cost in manufacturing a wear resistant member from the silicon nitride sintered body can be reduced.

EXAMPLES

Examples 1 to 7 and Comparative Examples 1 to 5

Raw material powders were made by preparing silicon nitride powders and sintering aids shown in Table 1. Crushing and mixing process was conducted by a ball mill.

TABLE 1

| | Silicon Nitride Powder | | Sintering Aid Powder | | |
|---|---|---|---|---|---|
| Sample No. | Average Grain Size (µm) | Oxidation Treatment | Component (Addition Amount) | Average Grain Size (µm) | Crushing & Mixing Time (Hr) |
| Example 1 | 0.8 | Heating in Atmosphere | $Al_2O_3$ (2 wt %), AlN (4 wt %), $Y_2O_3$ (2 wt %), $HfO_2$ (2 wt %), $Mo_2C$ (1 wt %) | 1.0 | 70 |
| Example 2 | 0.6 | Heating in Atmosphere | AlN (4 wt %), $Mg_2Al_2O_4$ (2 wt %), $Y_2O_3$ (1 wt %), $HfO_2$ (2 wt %), $Mo_2C$ (1 wt %) | 1.2 | 65 |
| Example 3 | 0.6 | Treatment with Water | AlN (4 wt %), $Mg_2Al_2O_4$ (2 wt %), $Y_2O_3$ (2 wt %), $HfO_2$ (2 wt %), $Mo_2C$ (1 wt %) | 1.0 | 60 |
| Example 4 | 0.6 | None | $Al_2O_3$ (3 wt %), AlN (3 wt %), $Y_2O_3$ (4 wt %), $HfO_2$ (2 wt %), $Mo_2C$ (1 wt %), SiC (5 wt %) | 1.2 | 50 |
| Example 5 | 0.8 | Heating in Atmosphere | $Al_2O_3$ (2 wt %), AlN (4 wt %), $Er_2O_3$ (2 wt %), $HfO_2$ (2 wt %), $Mo_2C$ (1 wt %) | 1.7 | 70 |

TABLE 1-continued

| | Silicon Nitride Powder | | Sintering Aid Powder | | |
|---|---|---|---|---|---|
| Sample No. | Average Grain Size (μm) | Oxidation Treatment | Component (Addition Amount) | Average Grain Size (μm) | Crushing & Mixing Time (Hr) |
| Example 6 | 0.6 | Heating in Atmosphere | Al$_2$O$_3$ (2 wt %), AlN (4 wt %), Er$_2$O$_3$ (2 wt %), ZrO$_2$ (2 wt %), Mo$_2$C (1 wt %) | 1.6 | 65 |
| Example 7 | 0.6 | Treatment with Water | Al$_2$O$_3$ (3 wt %), MgAl$_2$O$_4$ (3 wt %), Er$_2$O$_3$ (2 wt %), ZrO$_2$ (2 wt %), Mo$_2$C (1 wt %) | 1.4 | 60 |
| Comparative Example 1 | 1 | None | Al$_2$O$_3$ (7 wt %), Y$_2$O$_3$ (2 wt %), HfO$_2$ (2 wt %), Mo$_2$C (1 wt %), SiC (3 wt %) | 1.5 | 40 |
| Comparative Example 2 | 1.2 | None | Al$_2$O$_3$ (7 wt %), Er$_2$O$_3$ (2 wt %), HfO$_2$ (2 wt %), TiO$_2$ (1 wt %), Mo$_2$C (1 wt %), SiC (3 wt %) | 2.0 | 40 |
| Comparative Example 3 | 1.2 | None | Al$_2$O$_3$ (4 wt %), AlN (3 wt %), TiO$_2$ (1 wt %) | 1.2 | 50 |
| Comparative Example 4 | 1 | None | Al$_2$O$_3$ (7 wt %), Er$_2$O$_3$ (2 wt %), HfO$_2$ (2 wt %), Mo$_2$C (1 wt %), SiC (3 wt %) | 1.6 | 40 |
| Comparative Example 5 | 1 | None | Al$_2$O$_3$ (7 wt %), Er$_2$O$_3$ (2 wt %), ZrO$_2$ (2 wt %), Mo$_2$C (1 wt %), SiC (5 wt %) | 1.6 | 40 |

A binder was added to the obtained raw material mixtures, and the resultant mixtures were mixed with a ball mill.

Each raw material mixture was formed (molded) into a spherical object with a die press. The formed body was dried and thereafter degreased at 460° C. The degreased body was sintered under the condition of 1700 to 1750° C. for 5 to 6 hours in a nitrogen atmosphere. Moreover, the sintering process was conducted by storing a plurality of the degreased bodies in a porous type container (porosity 50%) in Examples 1 to 2 and 5 to 6.

A porous type container having a porosity of 60% was used in Example 3. A porous type container having a porosity of 35% was used in Examples 4 and 7. A porous type container having a porosity of 10% was used in Comparative Examples 1 to 2, and a porous type container having a porosity of 50% was used in Comparative Examples 3 to 5.

Next, HIP treatment was applied to thus obtained sintered bodies. The HIP treatment was conducted under a pressure of 100 MPa and the condition of 1600° C. for 1 hour. Thereby, the silicon nitride sintered bodies according to Examples 1 to 7 and Comparative Examples 1 to 5 were manufactured.

Cutting was conducted to each silicon nitride sintered body to obtain an arbitrary cross section, and an enlarged photograph (SEM photograph) of a 100 μm×100 μm unit area was taken. The area ratio of the grain boundary phase per unit area, the area ratio of the silicon nitride crystalline particle having a major axis of 1 μm or more, and the maximum value of the aspect ratio of the silicon nitride crystalline particle were determined using the enlarged photograph. Furthermore, the Vickers hardness and the fracture toughness value were measured to determine the machinable coefficient. The results are shown in Table 2 hereunder.

TABLE 2

| | Unit Area 100 μm × 100 μm | | | | | |
|---|---|---|---|---|---|---|
| Sample No. | Area Ratio of Grain Boundary Phase (%) | Area Ratio of Silicon Nitride Crystalline Particle having Major Axis of 1 μm or more (%) | Maximum Value of Aspect Ratio of Silicon Nitride Crystalline Particle | Vickers Hardness (Hv) | Fracture Toughness $K_{IC}$ (MPa·m$^{0.5}$) | Machinable Coefficient Mc |
| Example 1 | 21 | 65 | 5.5 | 1510 | 5.8 | 0.124 |
| Example 2 | 20 | 65 | 5.6 | 1480 | 5.8 | 0.126 |
| Example 3 | 27 | 60 | 6.1 | 1500 | 6.1 | 0.122 |
| Example 4 | 34 | 55 | 6.5 | 1500 | 5.9 | 0.124 |
| Example 5 | 22 | 60 | 5.5 | 1520 | 5.7 | 0.125 |
| Example 6 | 24 | 65 | 5.9 | 1500 | 5.6 | 0.127 |
| Example 7 | 34 | 55 | 5.6 | 1500 | 5.5 | 0.128 |
| Comparative Example 1 | 41 | 50 | 6.8 | 1470 | 5.2 | 0.134 |
| Comparative Example 2 | 44 | 50 | 8.7 | 1470 | 4.9 | 0.137 |
| Comparative Example 3 | 43 | 30 | 12.5 | 1510 | 6.5 | 0.117 |
| Comparative Example 4 | 41 | 50 | 6.9 | 1480 | 5.4 | 0.130 |
| Comparative Example 5 | 42 | 45 | 9.4 | 1490 | 5.1 | 0.133 |

With respect to the silicon nitride sintered bodies according to Examples 1 to 7, the area ratio of the grain boundary phase was 20 to 34%, and the area ratio of the silicon nitride crystalline particle having a major axis of 1 μm or more was 55% or more. Moreover, any of the maximum values of the silicon nitride crystalline particles was 7 or less. In addition, when the sum of both area ratios was not 100%, the insufficient portion is the area ratio of the silicon nitride crystalline particle having a major axis of less than 1 μm. Therefore, with respect to respective sintered bodies, a pore was not substantially confirmed.

Next, XRD analysis of the cross section of each silicon nitride sintered body was conducted. The results are shown in Table 3 hereunder.

TABLE 3

| Sample No. | Peak ($I_{29.5-30.5}$) in Range from 29.5 to 30.5° | Height Ratio ($I_{29.5-30.5}/I_{\beta\text{-}Si3N4}$) |
|---|---|---|
| Example 1 | Observed | 0.21 |
| Example 2 | Observed | 0.20 |
| Example 3 | Observed | 0.15 |
| Example 4 | Observed | 0.10 |
| Example 5 | Observed | 0.15 |
| Example 6 | Observed | 0.14 |
| Example 7 | Observed | 0.16 |
| Comparative Example 1 | Observed | 0.01 |
| Comparative Example 2 | Observed | 0.02 |
| Comparative Example 3 | Not Observed | — |
| Comparative Example 4 | Observed | 0.01 |
| Comparative Example 5 | Observed | 0.01 |

With respect to silicon nitride sintered bodies according to Examples 1 to 7, the peak ($I_{29.5-30.5}$) and the height ratio ($I_{29.5-30.5}/I_{\beta\text{-}Si3N4}$) were within a favorable range. As a result of conducting TEM analysis, the existence of a Hf—Y—O compound was detected. With respect to Comparative Examples 1 to 2 and 4 to 5, the peak ($I_{29.5-30.5}$) was detected; however, the height ratio ($I_{29.5-30.5}/I_{\beta\text{-}Si3N4}$) showed a small value. Further, with respect to Comparative Example 3, the peak ($I_{29.5-30.5}$) was not detected.

Next, easiness of polishing was measured. Polishing was conducted using a grinder equipped with a #220 diamond wheel, pressing a sample at 40 N, with a grinding area of 16 mm×16 mm, a revolving speed of the grinder of 300 rpm, and a revolving speed of the sample (silicon nitride sintered body) of 150 rpm. The time required for scraping about 400 μm in order to make a surface roughness Ra of 0.1 μm by such polishing was measured. The results are shown in Table 4 hereunder.

TABLE 4

| Sample No. | Polishing Time (min) |
|---|---|
| Example 1 | 31 |
| Example 2 | 30 |
| Example 3 | 35 |
| Example 4 | 43 |
| Example 5 | 33 |
| Example 6 | 35 |
| Example 7 | 32 |
| Comparative Example 1 | 54 |
| Comparative Example 2 | 60 |
| Comparative Example 3 | 100 |
| Comparative Example 4 | 62 |
| Comparative Example 5 | 67 |

As is clear from the data shown in the above Table 4, it was found that silicon sintered bodies according to Examples had a short polishing time.

Next, spherical sintered bodies were manufactured using the similar manufacturing method as in Examples 1 to 7. Next, bearing balls (diameter 9.525 mm) were manufactured by polishing the spherical sintered bodies using a diamond wheel so as to have a surface roughness Ra of 0.01 μm.

As a durability test, a rolling lifetime test was measured by rolling a bearing ball on a plate material made of bearing steel (SUJ2) under the conditions of a maximum contact pressure of 5.1 GPa and a number of revolutions of 1200 rpm with a thrust type bearing tester. A sample in which troubles such as surface cracks and breakage did not occur on the bearing balls by this test even after 400 hours elapsed was evaluated as a conforming article and was represented as "○ (good)", and a sample in which troubles occurred was represented as "X (poor)". The results are shown in Table 5 hereunder.

TABLE 5

| Sample No. | Durability Test |
|---|---|
| Example 1 | ○ Good |
| Example 2 | ○ Good |
| Example 3 | ○ Good |
| Example 4 | ○ Good |
| Example 5 | ○ Good |
| Example 6 | ○ Good |
| Example 7 | ○ Good |

It was found that the silicon sintered bodies according to the present Examples and the wear resistant members using the silicon nitride sintered bodies had a good processability and, besides, were excellent in wear resistance.

REFERENCE SIGNS LIST

1 Bearing ball
2 Silicon nitride crystalline particle

The invention claimed is:
1. A wear resistant member composed of a silicon nitride sintered body comprising a silicon nitride crystalline particle and a grain boundary phase, the silicon nitride sintered body having an area ratio of the grain boundary phase per 100 μm×100 μm unit area of 15 to 35% when an arbitrary cross section thereof is photographed,
wherein a total area ratio of the silicon nitride crystalline particle having a major axis L of 1 μm or more in a 100 μm×100 μm unit area is 60% or more, and any aspect ratio (major axis L/minor axis S) of the silicon nitride crystalline particles having a major axis of 1 μm or more is 7 or less, wherein a machinable coefficient of the silicon nitride sintered body is within a range from 0.120 to 0.150, and wherein a sliding surface of the silicon nitride sintered body is a polished surface having a surface roughness Ra of 0.1 μm or less.

2. The wear resistant member according to claim 1, wherein the area ratio of the grain boundary phase per 100 μm×100 μm unit area is 15 to 25%.

3. The wear resistant member according to claim 1, wherein a diffraction peak is detected in a range from 29.5 to 30.5° when XRD analysis of the silicon nitride sintered body is conducted.

4. The wear resistant member according to claim 3, wherein a height ratio ($I_{29.5-30.5}/I_{\beta\text{-}Si3N4}$) of a diffraction peak height $I_{29.5-30.5}$ in the range from 29.5° to 30.5° to a maximum peak height $I_{\beta\text{-}Si3N4}$ of β-silicon nitride is in a range from 0.05 to 0.25.

5. The wear resistant member according to claim 3, wherein the diffraction peak in the range from 29.5 to 30.5° is a peak attributable to a compound of group 4A element-rare earth element-oxygen.

6. The wear resistant member according to claim 3, wherein the diffraction peak in the range from 29.5 to 30.5° is attributable to a compound of hafnium-yttrium-oxygen.

7. The wear resistant member according to claim 1, wherein the silicon nitride sintered body comprises: 2 to 8 mass % of Al in terms of an oxide thereof; 1 to 3.5 mass % of a rare earth element in terms of an oxide thereof; and 1 to 5 mass % of any one or more of a group 4A element, a group 5A element, and a group 6A element in terms of an oxide thereof.

8. The wear resistant member according to claim 1, wherein the wear resistant member is a bearing ball.

9. The wear resistant member according to claim 8, wherein the bearing ball is a bearing ball for fan motors.

* * * * *